(12) United States Patent
Luo et al.

(10) Patent No.: US 8,971,333 B2
(45) Date of Patent: Mar. 3, 2015

(54) BANDWIDTH ADJUSTMENT METHOD AND SYSTEM FOR OPTICAL CHANNEL DATA UNIT FLEXIBLE BASED ON GENERIC FRAMING PROCEDURE

(75) Inventors: Bin Luo, Shenzhen (CN); Xiao Pemg, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 249 days.

(21) Appl. No.: 13/580,649

(22) PCT Filed: Sep. 25, 2010

(86) PCT No.: PCT/CN2010/077291
§ 371 (c)(1),
(2), (4) Date: Oct. 9, 2012

(87) PCT Pub. No.: WO2011/106974
PCT Pub. Date: Sep. 9, 2011

(65) Prior Publication Data
US 2013/0195458 A1  Aug. 1, 2013

(30) Foreign Application Priority Data
Mar. 4, 2010  (CN) .......................... 2010 1 0129083

(51) Int. Cl.
*H04J 3/24* (2006.01)
*H04B 10/27* (2013.01)
*H04J 3/16* (2006.01)
*H04L 12/24* (2006.01)
*H04L 12/913* (2013.01)
*H04L 12/919* (2013.01)

(52) U.S. Cl.
CPC .............. *H04B 10/27* (2013.01); *H04J 3/1652* (2013.01); *H04L 41/0896* (2013.01); *H04L 47/724* (2013.01); *H04L 47/765* (2013.01)
USPC ...... 370/395.41; 370/468; 370/474; 370/539; 398/45; 398/58

(58) Field of Classification Search
CPC .......................................................... H04J 3/16
USPC .......... 370/539, 474, 468, 395.41; 398/45, 58
See application file for complete search history.

(56) References Cited

U.S. PATENT DOCUMENTS

2012/0082456 A1* 4/2012 Su et al. .......................... 398/58
2012/0170936 A1* 7/2012 Vissers et al. ................... 398/58

FOREIGN PATENT DOCUMENTS

| CN | 1972243 A | 5/2007 |
|---|---|---|
| CN | 101035112 A | 9/2007 |
| WO | WO 2010/017838 A1 | 2/2010 |

*Primary Examiner* — Jay P Patel
(74) *Attorney, Agent, or Firm* — Koppel, Patrick, Heybl & Philpott

(57) ABSTRACT

The disclosure claims a bandwidth adjustment method and system for Optical channel Data Unit flexible (ODUflex) based on a Generic Framing Procedure (GFP), wherein, the method includes that: (501) a source end sends a bandwidth adjustment control frame which contains bandwidth adjustment parameters; (503) a plurality of intermediate nodes forward the bandwidth adjustment control frame to a sink end via an ODUflex link, during the forwarding process, the plurality of intermediate nodes determine that resource thereof can satisfy the bandwidth adjustment parameters, and then reserve the bandwidth adjustment resource; (505) after receiving the bandwidth adjustment control frame, the sink end feeds back an adjustment acknowledgment frame which contains adjustment acknowledgment information to the source end via the plurality of intermediate nodes; (507) the plurality of intermediate nodes use the reserved bandwidth adjustment resource to implement adjustment for the bandwidth of the ODUflex link according to the adjustment acknowledgement information of the adjustment acknowledgment frame. The disclosure realizes the bandwidth adjustment for the ODUflex without interrupting an existing service by increasing an Optical channel Payload Unit (OPU) overhead for the bandwidth adjustment in the ODUflex (GFP) frame.

17 Claims, 8 Drawing Sheets

_US 8,971,333 B2_

BANDWIDTH ADJUSTMENT METHOD AND SYSTEM FOR OPTICAL CHANNEL DATA UNIT FLEXIBLE BASED ON GENERIC FRAMING PROCEDURE

This is a National Stage Application of PCT/CN2010/077291 filed Sep. 25, 2010, published as WO 2011/106974 A1, and claiming priority from CN201010129083.6 filed Mar. 4, 2010.

FIELD OF THE INVENTION

The disclosure relates to the field of communication, and in particular to a bandwidth adjustment method and system for Optical channel Date Unit flexible (ODUflex) based on a Generic Framing Procedure (GFP) in an Optical Transport Network (OTN).

BACKGROUND OF THE INVENTION

At present, with the development of the OTN and the continuous improvement of the OTN-relative standards, the International Telecommunication Union Telecommunication Standardization Sector (ITU-T) provides the ODUflex. One kind of ODUflex in related art is the ODUflex (GFP) for bearing packet client signals. This technology encapsulates the packet client signals into the ODUflex (GFP) via the GFP. In this case, based on whether the rate is variable, the client signals are divided into the client signals with fixed bit rate and the client signals with variable bit rates.

The ODUflex (GFP) of the related art can have any rate. But at present, one ODUflex (GFP) is fixedly distributed with a large enough bandwidth, so as to make the ODUflex (GFP) completes transmission under the worst condition.

For example, the Ethernet Media Access Control (MAC) frame signals based on the 802.3 standards of Institute of Electrical and Electronics Engineers (IEEE) belong to the client signals with variable rates. The bandwidth request for the OTN is dynamically variable, and the frame length and frame gap are dynamically variable. Taking the example that an Optical channel Transport Unit (OTU) 3 bears 10 Gigabit Ethernet (10 GbE) MAC frame signals to transmit on the OTN network, the recent method includes: (1) implementing GFP encapsulation of frame mapping for the Ethernet MAC frame signals according to the possible maximum rate of the Ethernet MAC frame signals; (2) asynchronously mapping the signals which are implemented with GFP encapsulation to a low-order Optical channel Data Unit (ODU) 2. As the rate of the Ethernet MAC frame signals is continuously changed, a GFP idle frame needs to be inserted in the payload of the low-order ODU according to the change of the rate of the Ethernet MAC frame signals, so as to achieve the purpose of rate matching; and (3) multiplexing a plurality of low-order ODU2s to be a high-order ODU3. The high-order ODU3 forms the OTU3 signals to be transmitted in the OTN network after inserting the overhead. During the transmission process of the OTN, the number of Time Slot (TS) distributed to the low-order ODU2 is constant, that is, the occupied OTN network bandwidth is constant.

In a conclusion, the bandwidth of the packet client signals is variable along the time, but the redundant bandwidth which is distributed to the ODUflex (GFP) is constant, thereby the waste of bandwidth resource is caused.

SUMMARY OF THE INVENTION

The main purpose of the disclosure is to provide a bandwidth adjustment method and system for ODUflex based on a GFP, in order to solve the above problem.

According to one aspect of the disclosure, a bandwidth adjustment method for the ODUflex based on the GFP is provided, comprising steps of: a source end sending a bandwidth adjustment control frame which contains bandwidth adjustment parameters; a plurality of intermediate nodes forwarding the bandwidth adjustment control frame to a sink end via an ODUflex link, and during the forwarding process, if the plurality of intermediate nodes determine that resource of the plurality of intermediate nodes satisfy the bandwidth adjustment parameters, then a reserving bandwidth adjustment resource; after receiving the bandwidth adjustment control frame, the sink end feeding back to the source end an adjustment acknowledgment frame which contains adjustment acknowledgment information via the plurality of intermediate nodes; and the plurality of intermediate nodes using the reserved bandwidth adjustment resource to implement adjustment for bandwidth of the ODUflex link according to the adjustment acknowledgement information of the adjustment acknowledgment frame.

Preferably, the bandwidth adjustment parameters comprise: the bandwidth adjustment parameters comprise: a state indicator, a branch port number indicator, a number of branch Time Slot (TS) indicator, an intermediate mode state indicator and an adjustment state confirmation indicator.

Preferably, the state indicator comprises one of the followings: an increment indicator, a decrement indicator and a normal state.

Preferably, when the state indicator is the increment indicator, the step that the plurality of intermediate nodes use the reserved bandwidth adjustment resource to implement adjustment for bandwidth of the ODUflex link according to the adjustment acknowledgement information of the adjustment acknowledgment frame comprises: the plurality of intermediate nodes adding the reserved bandwidth adjustment resource to the ODUflex link; and after receiving the adjustment acknowledgement frame, the source end setting the state indicator of the bandwidth adjustment control frame to be the normal state, and sending the bandwidth adjustment control frame; or after receiving the adjustment acknowledgement frame, the source end setting the state indicator of the bandwidth adjustment control frame to be the normal state, and sending the bandwidth adjustment control frame; and during the forwarding process, the plurality of intermediate nodes adding the reserved bandwidth adjustment resource to the ODUflex link.

Preferably, when the state indicator is the decrement indicator, the step that the plurality of intermediate nodes use the reserved bandwidth adjustment resource to implement adjustment for the bandwidth of the ODUflex link according to the adjustment acknowledgement information of the adjustment acknowledgment frame comprises: the plurality of intermediate nodes removing the reserved bandwidth adjustment resource from the ODUflex link; and after receiving the adjustment acknowledgement frame, the source end setting the state indicator of the bandwidth adjustment control frame to be the normal state, and sending the bandwidth adjustment control frame; or after receiving the adjustment acknowledgement frame, the source end setting the state indicator of the bandwidth adjustment control frame to be the normal state, and sending the bandwidth adjustment control frame; and during the forwarding process, the plurality of intermediate nodes removing the reserved bandwidth adjustment resource from the ODUflex link.

Preferably, the bandwidth adjustment parameters are located in the first, second and third rows of the fifteenth column in an Optical channel Payload Unit flexible Payload (OPUflex) area of the ODUflex.

Preferably, a bandwidth adjustment control frame is a multi-frame, including 4*N frames, where N is a natural number.

Preferably, the bandwidth adjustment method for the ODUflex based on the GFP also comprises steps of: during the process of forwarding the bandwidth adjustment control frame to the sink end, if the plurality of intermediate nodes determine that the resource of the plurality of intermediate nodes cannot satisfy the bandwidth adjustment parameters, then stopping forwarding the bandwidth adjustment control frame, and sending an adjustment failure frame which contains adjustment failure information to the source end; and the source end receiving the adjustment failure frame, and stopping adjusting the bandwidth of the ODUflex link.

Preferably, the step of sending the adjustment failure frame which contains the adjustment failure information to the source end comprises: one intermediate node determining that the resource of the intermediate node cannot satisfy the bandwidth adjustment parameters; and the plurality of intermediate nodes, which are before the intermediate node which determines that the resource is insufficient in the direction of the source end, forwarding the adjustment failure frame which contains the adjustment failure information to the source end, and releasing the reserved bandwidth adjustment resource.

According to another aspect of the disclosure, a bandwidth adjustment system for the ODUflex based on the GFP is provided, comprising: a source end, configured to send a bandwidth adjustment control frame which contains bandwidth adjustment parameters; a plurality of intermediate nodes, which comprise: a forwarding module, configured to forward the bandwidth adjustment control frame to a sink end via an ODUflex link, and forward an adjustment acknowledgement frame which contains adjustment acknowledgement information to the source end; a reservation module, configured to, during the forwarding process, if it is determined that resource of the plurality of intermediate nodes satisfy the bandwidth adjustment parameters, reserve a bandwidth adjustment resource; and an adjustment module, configured to use the reserved bandwidth adjustment resource to adjust the bandwidth of the ODUflex link according to the adjustment acknowledgement information of the adjustment acknowledgement frame; and the sink end, configured to send the adjustment acknowledgement frame after receiving the bandwidth adjustment control frame.

Preferably, the bandwidth adjustment parameters comprise a state indicator, and the state indicator comprises one of: an increment indicator, an decrement indicator and a normal state.

Preferably, the adjustment module comprises: a resource increasing sub-module, configured to add the reserved bandwidth adjustment resource to the ODUflex link when the state indicator is the increment indicator; and a resource decreasing sub-module, configured to remove the reserved bandwidth adjustment resource from the ODUflex link when the state indicator is the decrement indicator.

Preferably, the plurality of intermediate nodes also comprise: the plurality of intermediate nodes further comprise: an adjustment failure module, configured to, during the forwarding process, if it is determined that the resource of the plurality of intermediate nodes cannot satisfy the bandwidth adjustment parameters, stop forwarding the bandwidth adjustment control frame, and send the adjustment failure frame which contains the adjustment failure information to the source end; and the source end is further configured to receive the adjustment failure frame, and stop adjusting the bandwidth of the ODUflex link.

Preferably, the plurality of intermediate nodes further comprise: a resource releasing module, configured to receive the adjustment failure frame, and release the reserved bandwidth adjustment resource.

Certain embodiments of the disclosure enable the ODUflex (GFP) frame to have a bandwidth adjustment capacity by increasing the bandwidth of ODUflex (GFP) frame to adjust the overhead of the Optical channel Payload Unit (OPU). Compared with the related art, the disclosure has the advantages that:

(1) the adjustment process of the ODUflex (GFP) neither needs to detach an original ODUflex link, nor needs to re-establish a new link which satisfies the bandwidth request; and the ODUflex (GFP) link keeps a normal working state during the adjustment process, and has no interruption;

(2) the Network Management System (NMS) and the control plane need not to be upgraded, as the network manager and the control plane almost do not participate in the adjustment process; thus, a lot of management and implementation difficulties caused by upgrading the NMS or the control plane can be avoided; and (3) the adjustment method is simple, so the bandwidth adjustment for the ODUflex (GFP) can be simply realized, and software and hardware can be conveniently updated.

BRIEF DESCRIPTION OF THE DRAWINGS

The drawings described herein are provided for further understanding of the disclosure, and forming a part of the application. The schematic embodiments and descriptions thereof are used for explaining the disclosure, without unduly limiting the disclosure. In the drawings.

DETAILED DESCRIPTION OF THE EMBODIMENTS

The disclosure is described hereinafter in detail with reference to the drawings and in conjunction with the embodiments. It should be noted that, the embodiments and the features in the embodiments can be combined with each other if there is no conflict.

Figure 1:
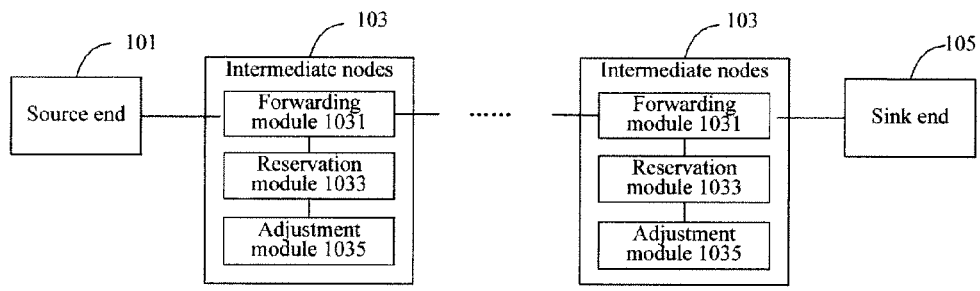
FIG. 1 shows a structural diagram of embodiment I of a bandwidth adjustment system for ODUflex based on GFP according to the embodiment of the disclosure.

As shown in FIG. 1, it shows a structural diagram of embodiment I of a bandwidth adjustment system for ODUflex based on GFP according to the embodiment of the disclosure, specifically comprising:

a source end 101, which is configured to send a bandwidth adjustment control frame which contains the bandwidth adjustment parameters;

a plurality of intermediate nodes 103, wherein each of the intermediate nodes 103 comprises:

a forwarding module 1031, which is configured to forward the bandwidth adjustment control frame to a sink end 105 via the ODUflex link, and forward to the source end 101 the adjustment acknowledgement frame which contains the adjustment acknowledgement information and is fed back by the sink end 105;

a reservation module 1033, which is configured to, during the process of forwarding the bandwidth adjustment control frame, if it is determined that resource of the plurality of intermediate nodes satisfy the bandwidth adjustment parameters, reserve the bandwidth adjustment resource; and an adjustment module 1035, which is configured to use the reserved bandwidth adjustment resource to adjust the bandwidth of the ODUflex link according to the adjustment acknowledgement information of the adjustment acknowledgement frame; and a sink end 105, which is configured to send the adjustment acknowledgement frame after receiving the bandwidth adjustment control frame.

Specifically, when the flow of the ODUflex link increases or decreases, the bandwidth adjustment of the ODUflex link needs to be started, and the NMS can notify the source end 101 to initiate the adjustment process.

The source end 101 sends the bandwidth adjustment control frame to the adjacent intermediate node 103 which is adjacent to the source end 101 in the direction of the sink end 105, wherein the bandwidth adjustment frame comprises the bandwidth adjustment parameters, such as the state indicator of increasing or decreasing bandwidth, the indicator of the branch port number requesting bandwidth adjustment, the indicator of number of branch TS requesting adjustment, the intermediate node state indicator, the adjustment state confirmation indicator and the like.

After the intermediate node 103 receives the bandwidth adjustment control frame, and if there is a resource which satisfies the bandwidth adjustment parameters such as an idle TS, the reservation module 1033 reserves the resource for the ODUflex link, and forwards the bandwidth adjustment control frame to a next intermediate node 103 via the forwarding module 1031. After receiving the forwarded bandwidth adjustment control frame, the next intermediate node 103 also determines whether it has the resource which can satisfy the bandwidth adjustment parameters. If yes, reserving the resource, and forwarding the bandwidth adjustment control frame to an adjacent next intermediate node 103 in the direction of the sink end 105. Each of the intermediate nodes 103 implements the above reservation and forwarding process under the condition of satisfying the bandwidth adjustment parameters, till the sink end 105 is reached.

When the sink end 105 receives the bandwidth adjustment control frame, it represents that all the intermediate nodes 103 between the source end 101 and the sink end 105 can satisfy the bandwidth adjustment parameters, and that bandwidth adjustment for the ODUflex link can be implemented. And now, the sink end 105 sends the adjustment acknowledgement frame which contains the adjustment acknowledgement information to the direction of the source end 101 via the forwarding module 1031 of the intermediate nodes 103. After the intermediate nodes 103 receive the adjustment acknowledgement frame, the adjustment module 1035 implements adjustment for the bandwidth of the ODUflex link by using the reserved resource.

Figure 2:
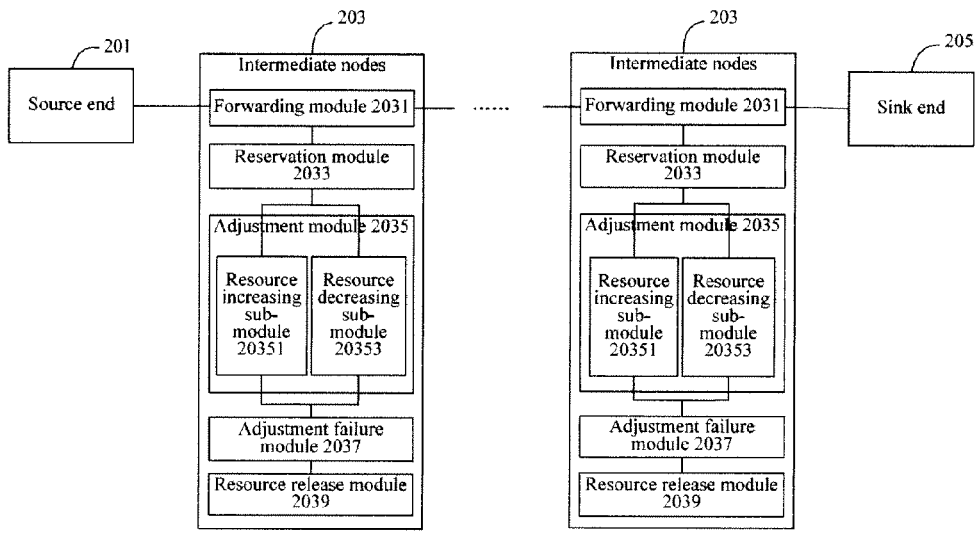
FIG. 2 shows a structural diagram of embodiment II of a bandwidth adjustment system for ODUflex based on GFP according to the embodiment of the disclosure.

As shown in FIG. 2, it shows a structural diagram of embodiment II of a bandwidth adjustment system for ODUflex based on GFP according to the embodiment of the disclosure, specifically comprising:

a source end 201, configured to send the bandwidth adjustment control frame which contains the bandwidth adjustment parameters, and to receive an adjustment failure frame, and stop implementing adjustment for the bandwidth of the ODUflex link, wherein the bandwidth adjustment parameters comprise the state indicator, and the state indicator comprises the increment indicator, the decrement indicator and the normal state; and a plurality of intermediate nodes 203, wherein each of the intermediate nodes 203 comprises:

a forwarding module 2031, configured to forward the bandwidth adjustment control frame to a sink end 205 via the ODUflex link, and forward to the source end 201 the adjustment acknowledgement frame containing the adjustment acknowledgement information which is feed back by the sink end 205;

a reservation module 2033, configured to, during the process of forwarding the bandwidth adjustment control frame, if it is determined that resource of the plurality of intermediate nodes satisfy the bandwidth adjustment parameters, reserve bandwidth adjustment resource; and an adjustment module 2035, configured to use the reserved bandwidth adjustment resource to adjust the bandwidth of the ODUflex link according to the adjustment acknowledgement information of the adjustment acknowledgement frame.

Preferably, the adjustment module 2035 can further comprise:

a resource increasing sub-module 20351, configured to add the reserved bandwidth adjustment resource to the ODUflex link when the state indicator is the increment indicator; and a resource decreasing sub-module 20353, configured to remove the reserved bandwidth adjustment resource from the ODUflex link when the state indicator is the decrement indicator.

The intermediate nodes 203 can further comprise:

an adjustment failure module 2037, configured to, during the forwarding process, if it is determined that the resource cannot satisfy the bandwidth adjustment parameters, stop forwarding the bandwidth adjustment control frame, and send to the source end 201 the adjustment failure frame which contains the adjustment failure information; and a resource releasing module 2039, configured to receive the adjustment failure frame, and release the reserved bandwidth adjustment resource.

And, the sink end 205 is configured to send the adjustment acknowledgement frame after receiving the bandwidth adjustment control frame.

Description is given below taking the example that the flow of the ODUflex link increases and the bandwidth of the ODUflex link needs to be increased. The source end 201 sends the bandwidth adjustment control frame, of which the state indicator is the increment indicator, to the first intermediate node 203 in the direction of the sink end 205. The first intermediate node 203 determines that its resource can satisfy the adjustment request. Its reservation module 2033 reserves the resource, and forwards the bandwidth adjustment control frame to the second intermediate node 203 via the forwarding module 2031. After receiving the bandwidth adjustment control frame, the second intermediate node 203 determines that its resource cannot satisfy the adjustment request. Its adjustment failure module 2037 stops forwarding the bandwidth adjustment control frame to the next intermediate node 203, and sends the adjustment failure frame which contains the adjustment failure information to the first intermediate node 203. After receiving the adjustment failure frame, the resource releasing module 2039 of the first intermediate node 203 releases the reserved resource, and forwards the adjustment failure frame to the source end 201 via the forwarding module 2031. The source end 201 receives the adjustment failure frame, and stops implementing the increment adjustment for the bandwidth of the ODUflex link.

In the above process, if the second intermediate node 203 has a resource which can satisfy the adjustment request, the resource is reserved, and the bandwidth adjustment control frame is continuously forwarded to the third intermediate node 203. If all the intermediate nodes 203 between the source end 201 and the sink end 205 have the resource which can satisfy the adjustment request, all the resource is reserved. The bandwidth adjustment control frame is sequentially forwarded by the intermediate nodes 203, till the sink end 205 is reached. The sink end 205 receives the bandwidth adjustment control frame, and knows that all the intermediate nodes 203 can satisfy the bandwidth adjustment parameters, and then can implement increment adjustment for the bandwidth of the ODUflex link. The sink end 205 sequentially sends the adjustment acknowledgement frame which contains the acknowledgement information to the source end 201 via the intermediate nodes 203. After receiving the adjustment acknowledgement frame, the intermediate nodes 203 know that the bandwidth of the ODUflex link can be increased. Then, the resource increasing sub-module 20351 uses the reserved resource to implement increment adjustment for the bandwidth of the ODUflex link.

When the flow of the ODUflex link decreases and the bandwidth of the ODUflex link needs to be decreased, the decrement adjustment of the ODUflex bandwidth adjustment system for the link bandwidth is similar to the increment adjustment for the link bandwidth, so it is not repeated here.

Via this embodiment, the bandwidth of the ODUflex link is dynamically adjusted. Thus, various bandwidth requests of the packet client signals can be better satisfied, a bandwidth utilization rate can be effectively improved, and the bandwidth resource can be saved.

The disclosure adjusts the bandwidth of the ODUflex link by using the ODUflex bandwidth adjustment control frame which contains the bandwidth adjustment parameters. The ODUflex bandwidth adjustment parameters comprise a state indicator CTRL, a branch port number indicator TP#, a number of branch TS indicator TSN, an intermediate node state indicator ISC and an adjustment state confirmation indicator RSC. Optionally, the ODUflex bandwidth adjustment parameters also can comprise Cyclic Redundancy Check (CRC). By using the parameters, the intermediate nodes can conveniently know the situation that the ODUflex link needs resource adjustment, and thus improving the adjustment efficiency of the link bandwidth.

By taking FIG. 3 and FIG. 4 as examples, the ODUflex bandwidth adjustment control frame according to the embodiment of the disclosure is described below.

Figures 3, 4:
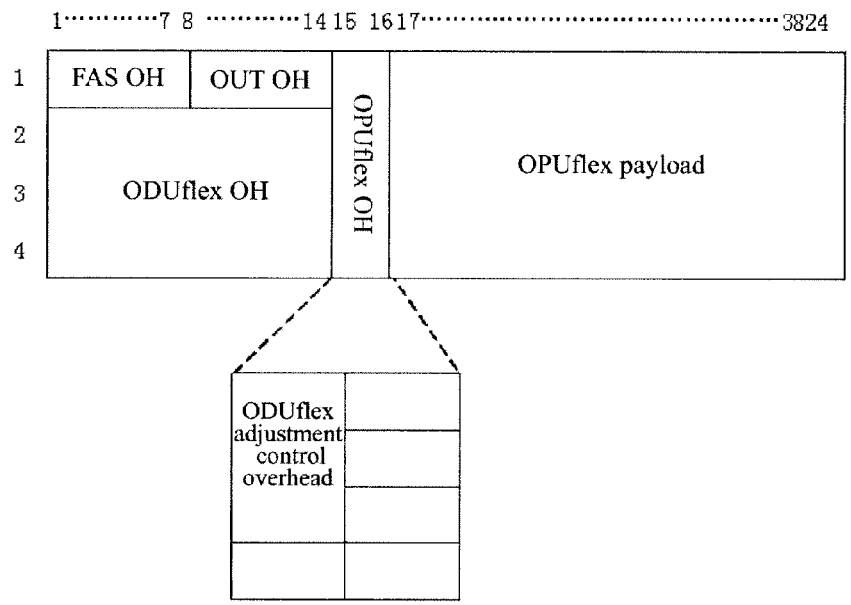
FIG. 3 shows a position diagram of ODUflex bandwidth adjustment parameters according to the embodiment of the disclosure.
FIG. 4 shows a structural diagram of an ODUflex bandwidth adjustment control frame according to the embodiment of the disclosure.

As shown in FIG. 3, it shows a position diagram of ODUflex bandwidth adjustment parameters according to the embodiment of the disclosure. In the embodiment, an ODUflex frame comprises a frame locating area FAS OH, an OTU special overhead area OTU OH, an ODU special overhead area ODUflex OH, an Optical channel Payload Unit flexible Payload (OPUflex) and an OPU special overhead area OPUflex OH. The bandwidth adjustment parameters can be arranged on the first, second and third rows in the fifteenth column of the OPUflex OH area, so as to form a new OPUflex control overhead. The fifteenth column of the OPUflex OH area is a reserved area at present. On one hand, the arrangement of the parameters in this area can save the implementation cost and decrease the signalling overhead because of not using independent data frames. On the other hand, the arrangement of the parameters in this area makes the intermediate nodes, the source end and the sink end which receive the ODUflex frame interpret the related control overheads directly from the ODUflex to adjust the bandwidth, without too much adjustment of software and hardware.

The new OPUflex control overhead uses a multi-frame structure, and organizes the multi-frame via a Multi-Frame Alignment Signal (MFAS). The multi-frame can be composed of 4*N (N=1, 2, 3, . . . , 64) frames. In this embodiment, N=1. Thus, an enough space can be knowd for indicating the branch port number and number of the branch TS, which is convenient for expanding the overhead when a high-order ODU (HO ODU) with a higher rate appears in the future. The new OPUflex control overhead can be arranged in any position in the multi-frame structure. When N=1, the control overhead can be set as the structure shown in FIG. 4.

The definition of the new OPUflex control overhead is as follows.

2-bit CTRL: a state indicator, INCREMENT (01) represents to increase the branch TS, DECREMENT (10) represents to decrease TS, NORMAL (11) represents the normal state, and UNUSED (00) represents that the device does not support the adjustment. By setting the state indicator in the OPUflex control overhead, the bandwidth adjustment request of the ODUflex link can be directly acquired, and the extra signalling overhead can be decreased.

7-bit TP#: for indicating the branch port number which needs to increase or decrease the bandwidth; and it can uniquely represent the ODUflex frame. When it is HO OPU2, 3-bit can be used; when it is HO OPU3, 5-bit can be used, and when it is HO OPU4, 7-bit can be used.

7-bit TSN: for indicating the number of TSs which need to be increased or decreased. When it is HO OPU2, 3-bit can be used; when it is HO OPU3, 5-bit can be used; and when it is HO OPU4, 7-bit can be used.

1-bit ISC: an intermediate node state indicator; the intermediate nodes send the ODUflex frames to the source end So and the sink end Sk. ISC=OK(0) represents that the number of idle TSs of the intermediate nodes satisfies the requests; otherwise, it represents that the intermediate nodes do not have enough TSs to complete the adjustment, such as ISC=FAILED (1). The default value of the ISC is 0.

1-bit RSC: an adjustment state confirmation indicator, sent to the source end So and all the intermediate nodes from the sink end Sk. The RSC invert represents that the sink end Sk confirms receipt of the ODUflex bandwidth adjustment control frame, and all the intermediate nodes in the whole link can satisfy the TS requirement of the adjustment, and can implement the adjustment.

Optional CRC verification: certain bits of CRC can be selected and arranged for error verification in each frame of the ODUflex multi-frame. The CRC verification also can be saved. The embodiment selects CRC8 as an example.

Figure 5:
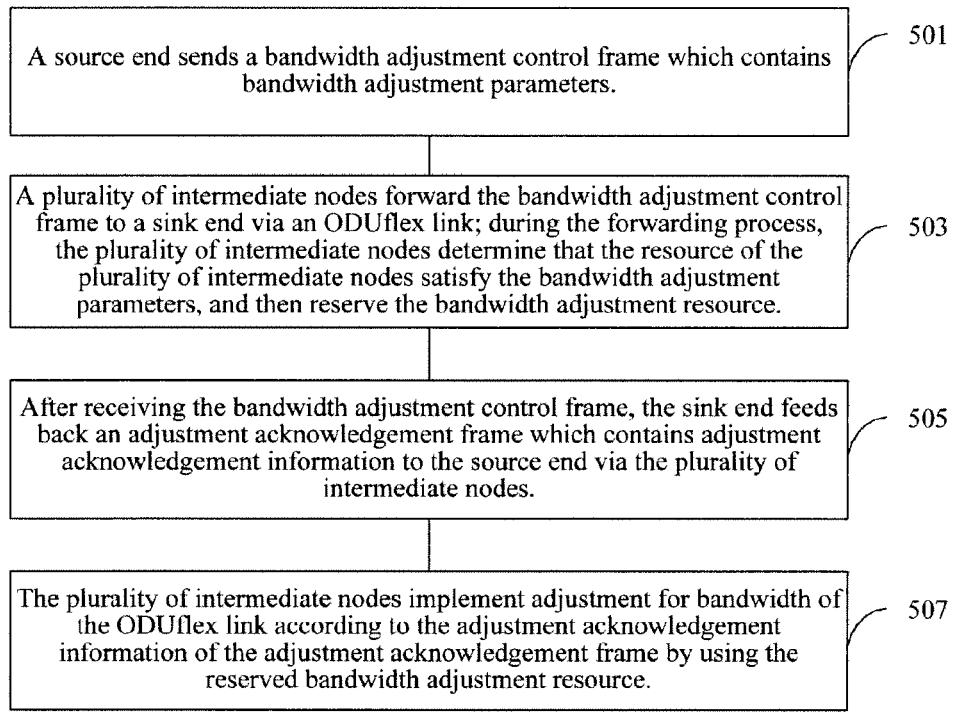
FIG. 5 shows a step flowchart of embodiment I of a bandwidth adjustment method for ODUflex based on GFP according to the embodiment of the disclosure.

As shown in FIG. 5, it shows a step flowchart of embodiment I of a bandwidth adjustment method for ODUflex based on GFP according to the embodiment of the disclosure, specifically comprising the following steps.

Step 501: the source end sends the bandwidth adjustment control frame which contains the bandwidth adjustment parameters.

The bandwidth adjustment control frame can be the ODUflex frame shown in FIG. 4. The bandwidth adjustment parameters can comprise: the state indicator CTRL, the branch port number indicator TP#, the number of branch TS indicator TSN, the intermediate node state indicator ISC and the adjustment state confirmation indicator RSC. Optionally, the bandwidth adjustment parameters also can comprise the CRC verification.

Step 503: a plurality of intermediate nodes forward the bandwidth adjustment control frame to the sink end via the ODUflex link; during the forwarding process, the plurality of intermediate nodes determine that the resource of the plurality of intermediate nodes can satisfy the bandwidth adjustment parameters, and then reserve the bandwidth adjustment resource.

The plurality of intermediate nodes between the source end and the sink end sequentially forward the bandwidth adjustment control frame to the sink end; during the forwarding process, each of the intermediate nodes determines whether the resource thereof satisfies the bandwidth adjustment parameters, and if yes, reserve the resource, and forward the bandwidth adjustment control frame to a next intermediate node.

Step 505: after receiving the bandwidth adjustment control frame, the sink end feeds back the adjustment acknowledgement frame which contains the adjustment acknowledgement information to the source end via the plurality of intermediate nodes.

After receiving the bandwidth adjustment control frame, the sink end sends the adjustment acknowledgement frame which contains the adjustment acknowledgement information, wherein the adjustment acknowledgement frame can be the ODUflex bandwidth adjustment control frame of RSC invert; the plurality of intermediate nodes sequentially forward the adjustment acknowledgement frame to the direction of the source end, till the source end is reached.

Step 507: the plurality of intermediate nodes implement adjustment for the bandwidth of the ODUflex link by using the reserved bandwidth adjustment resource according to the adjustment acknowledgement information of the adjustment acknowledgement frame.

After receiving the adjustment acknowledgement frame, the plurality of intermediate nodes confirm to implement the bandwidth adjustment, add the reserved bandwidth adjustment resource to the original ODUflex link, or remove the reserved bandwidth adjustment resource from the original ODUflex link.

Figure 6:
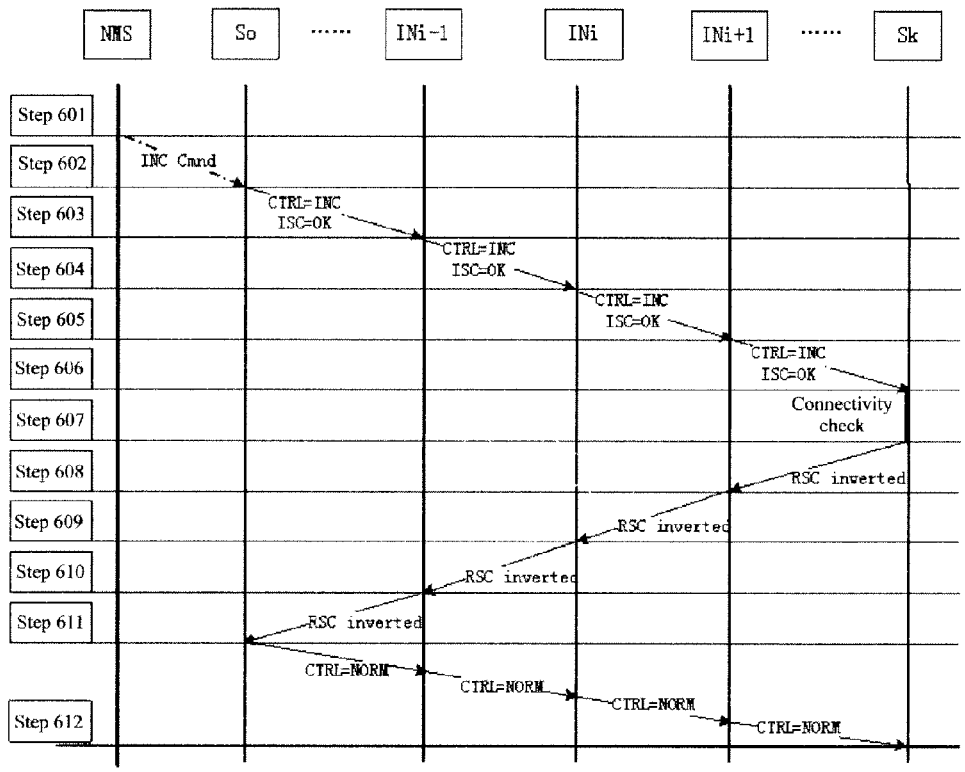
FIG. 6 shows a process chart for a successful ODUflex bandwidth increase adjustment according to the embodiment of the disclosure.

As shown in FIG. 6, it shows a process chart for a successful ODUflex (GFP) bandwidth increase adjustment according to the embodiment of the disclosure. When all the intermediate nodes between the source end and the sink end have the idle TSs which can satisfy the increment request, the increment adjustment of the ODUflex (GFP) bandwidth can be completed. Specifically, the adjustment process comprises the following steps.

Step 601: when the flow of the ODUflex link increases, an adjustment process for the bandwidth of the ODUflex link is started.

Step 602: the NMS notifies the source end So to initiate the TS increment adjustment process.

Step 603: the source end So sends the bandwidth adjustment control frame to a next intermediate node in the direction of the sink end Sk, wherein the bandwidth adjustment parameters are set as: CTRL=INCREMENT, ISC=OK, TP# is the port of which the bandwidth needs to be increased, and TSC is the number of TSs that is requested to be increased.

Steps 604-606: after the intermediate nodes receive the CTRL=INCREMENT bandwidth adjustment control frame, if there are idle TSs which can satisfy the requests, the intermediate nodes reserve TSN TSs for the ODUflex link, wherein the TSN TSs first does not load the data; and the intermediate nodes forward the CTRL=INCREMENT bandwidth adjustment control frame to the next intermediate node, till the sink end Sk is reached.

Step 607; when the sink end Sk receives the ODUflex frame with CTRL=INCREMENT and ISC=0, it represents that all the intermediate nodes satisfy the adjustment request, and then the sink end Sk implements the connectivity check. After the connectivity check is passed, the sink end Sk sends an RSC invert control frame to the source end So via the intermediate nodes.

In this case, the connectivity check is an optional step.

Steps 608-611: all the intermediate nodes which receive the RSC invert control frame know that all the intermediate nodes on the whole link can satisfy the adjustment request, and can implement the adjustment. In this case, the intermediate nodes add the reserved TSN TSs to the original ODUflex link.

Step 612: after receiving the RSC invert control frame, the source end So changes the CTRL of the frame to be NORMAL, and sends the changed frame to the sink end Sk via the intermediate nodes. After receiving the ODUflex frame with the CTRL=NORMAL, the intermediate nodes and the sink end Sk know that a new bandwidth starts, and each of the intermediate nodes uses the adjusted bandwidth to load the ODUflex.

In the above, the Steps 608-611, and Step 612 also can be that: Steps 608-611: all the intermediate nodes which receive the RSC invert control frame know that the increment adjustment can be implemented; and Step 612: after receiving the RSC invert control frame, the source end So changes the CTRL of the frame to be NORMAL. After receiving the ODUflex frame with the CTRL=NORMAL, the intermediate nodes and the sink end Sk know that the increment adjustment starts, and add the reserved TSN TSs to the original ODUflex link. In this case, each of the intermediate nodes uses the adjusted bandwidth to load the ODUflex.

Via this embodiment, the increment adjustment for the bandwidth of the ODUflex link can be dynamically implemented without interrupting the existing service, and the implementation is simple.

Figure 7:
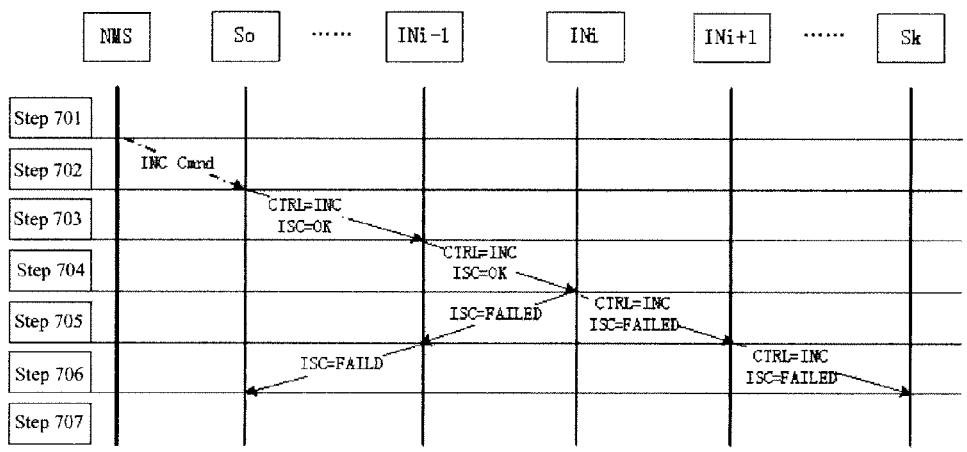
FIG. 7 shows a process chart of a failed ODUflex bandwidth increase adjustment according to the embodiment of the disclosure.

As shown in FIG. 7, it shows a process chart of a failed ODUflex (GFP) bandwidth increase adjustment according to the embodiment of the disclosure. When any intermediate node between the source end and the sink end does not have the idle TSs needed for the increment adjustment, the increment adjustment for the ODUflex (GFP) bandwidth is failed. A failed increment adjustment process for the ODUflex (GFP) bandwidth comprises the following steps:

Step 701: when the flow of the ODUflex link increases, the adjustment process for the bandwidth of the ODUflex link starts;

Step 702: the NMS notifies the source end So to initiate the TS increment adjustment process;

Step 703: the source end So sends the bandwidth adjustment control frame to the next intermediate node in the direction of the sink end Sk, wherein the bandwidth adjustment parameters are set as: CTRL=INCREMENT, ISC=OK, TP# is the port of which the bandwidth needs to be increased, and TSN is the number of TSs requested to be increased;

Steps 704-706: after the intermediate node i−1 receives the CTRL=INCREMENT bandwidth adjustment control frame, if there are enough idle TSs, the intermediate node i−1 reserves TSN TSs for the ODUflex link, and forwards the CTRL=INCREMENT bandwidth adjustment control frame to the next intermediate node i;

Step 705: after the intermediate node i receives the CTRL=INCREMENT bandwidth adjustment control frame, if there are not enough idle TSs for completing the adjustment, the intermediate node i respectively sends the ISC=FAILED bandwidth adjustment control frame to the direction of the source end So and to the direction of the sink end Sk, wherein the step of sending the ISC=FAILED bandwidth adjustment control frame to the direction of the sink end Sk is optional;

Step 706: after receiving the ISC=FAILED bandwidth adjustment control frame, all the intermediate nodes in the direction of the source end So know that some intermediate node cannot complete the adjustment; then these nodes first release the reserved TSN TSs; and after receiving the CTRL=INCREMENT and ISC=FAILED bandwidth adjustment control frame, all the intermediate nodes in the direction of the sink end Sk and the sink end Sk know that there is an increment adjustment, but some intermediate node cannot complete the adjustment; and Step 707: when the source end So knows that some intermediate node cannot complete the adjustment after receiving the ISC=FAILED bandwidth adjustment control frame, the source end So stops the current adjustment process.

Via this embodiment, when some intermediate node cannot complete the adjustment, the source end So and all the nodes before this intermediate node can be notified immediately, so as to make the resource reserved by the intermediate node be released immediately, without influencing the state of the current link.

Figure 8:
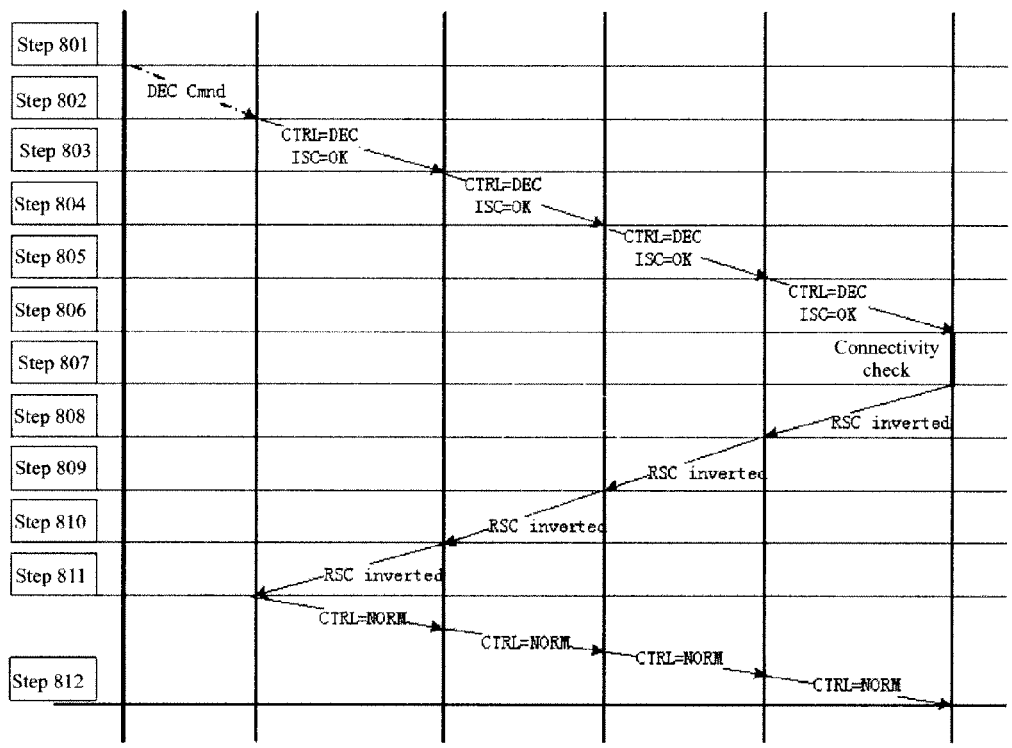
FIG. 8 shows a process chart of ODUflex bandwidth decrease adjustment according to the embodiment of the disclosure.

As shown in FIG. 8, it shows a process chart of ODUflex (GFP) bandwidth decrease adjustment according to the embodiment of the disclosure. The adjustment process comprises the following steps:

Step 801: when the flow of the ODUflex link decreases, the bandwidth decrease adjustment process for the ODUflex link is started;

Step 802: the NMS notifies the source end So to initiate the TS decrement adjustment process;

Step 803: the source end So sends the bandwidth adjustment control frame to the next node in the direction of the sink end Sk, wherein the bandwidth adjustment parameters are set as: CTRL=DECREMENT, ISC=OK, TP# is the port of which the bandwidth needs to be decreased, and TSC is the number of TSs requested to be decreased;

Steps 804-806: after receiving the CTRL=DECREMENT bandwidth adjustment control frame, the intermediate nodes select TSN TSs as adjustment objects, without removing the TSN TSs at the moment, and continuously let the TSs work; and the intermediate nodes forward the CTRL=DECREMENT bandwidth adjustment control frame to the next intermediate node, till the sink end Sk is reached;

Step 807: when the sink end Sk receives the CTRL=DECREMENT and ISC=0 bandwidth adjustment control frame, it represents that all the intermediate nodes between the source end So and the sink end Sk can satisfy the adjustment request, and then the sink end Sk implements the connectivity check; after the connectivity check is passed, the sink end Sk sends an RSC invert control frame to the direction of the source end So via the intermediate nodes, wherein the connectivity check is a optional step;

Steps 808-811: all the intermediate nodes which receive the RSC invert control frame know that the decrement adjustment can be implemented; and Step 812: after receiving the RSC invert control frame, the source end So changes the CTRL of the frame to be NORMAL; after receiving the CTRL=NORMAL ODUflex frame, the intermediate nodes and the sink end Sk know that the decrement adjustment starts, and remove the previously selected TSN TSs; and in this case, each of the intermediate nodes uses the adjusted bandwidth to load the ODUflex.

Via this embodiment, the decrement adjustment for the bandwidth of the ODUflex link can be dynamically implemented without interrupting the existing service, and the implementation is simple.

Figure 9:
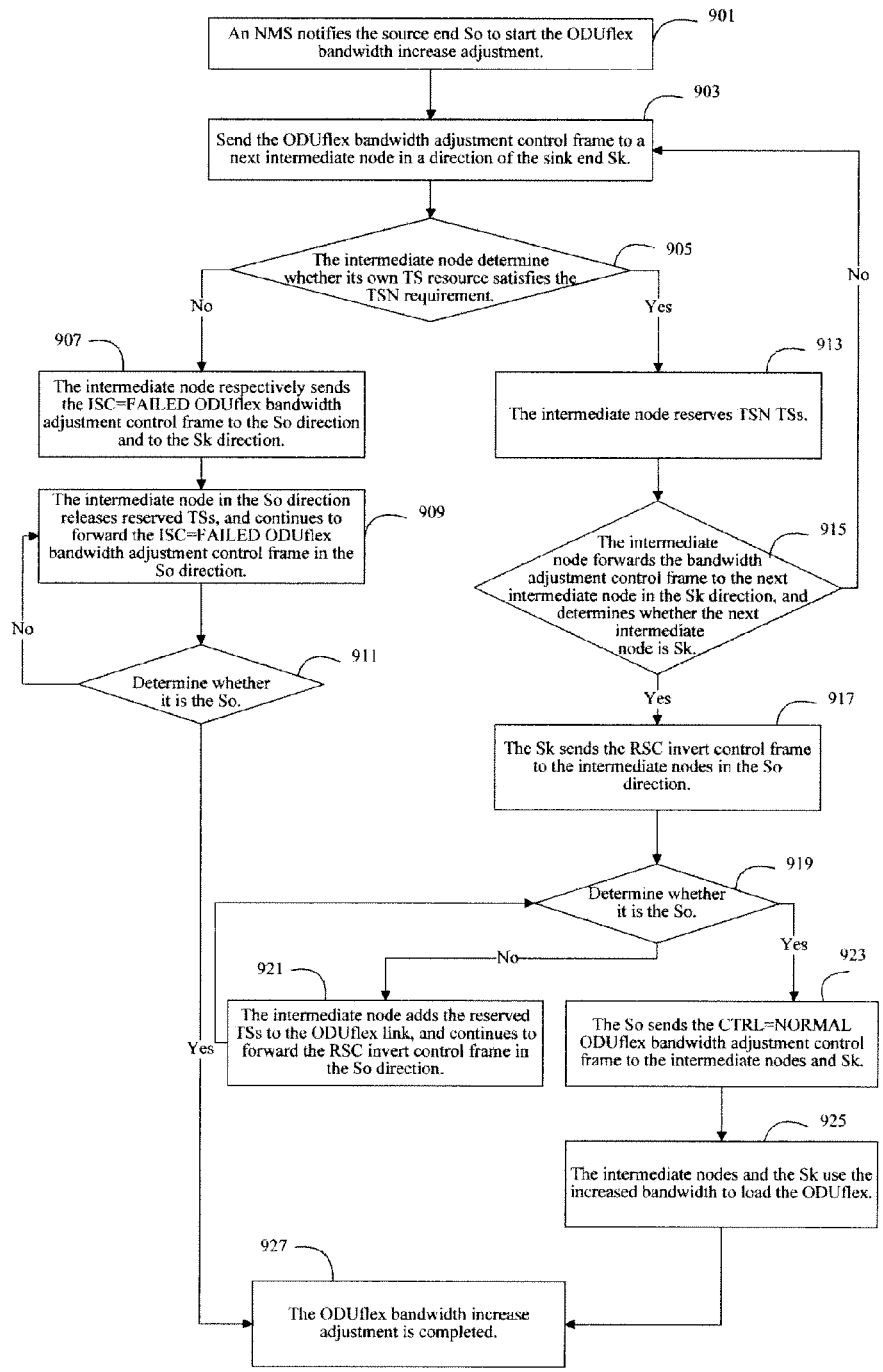
FIG. 9 shows a step flowchart of embodiment I of an ODUflex bandwidth increase adjustment method according to the embodiment of the disclosure.

As shown in FIG. 9, it shows a step flowchart of embodiment I of an ODUflex (GFP) bandwidth increase adjustment method according to the embodiment of the disclosure, specifically comprising the following steps.

Step 901: the NMS notifies the source end So to start the increment adjustment for the ODUflex link.

Sending of the ODUflex bandwidth adjustment control frame is started from the source end So.

Step 903: the ODUflex bandwidth adjustment control frame is sent to the next intermediate node in the direction of the sink end Sk.

The OPU control overhead in the ODUflex bandwidth adjustment control frame is set to be: CTRL=INCREMENT, ISC=OK, TP# is the port which needs to increase the bandwidth, TSN and the like.

Step 905: the intermediate node determines whether its own TS resource satisfies the TSN requirement, and if no, go to Step 907; otherwise, go to Step 913.

Step 907: the intermediate node respectively sends the ISC=FAILED ODUflex bandwidth adjustment control frame to the So direction and to the Sk direction.

In this step, the intermediate node also can send the ISC=FAILED ODUflex bandwidth adjustment control frame to the So direction only.

Step 909: the intermediate node in the So direction releases the reserved TS and continues to forward the ISC=FAILED ODUflex bandwidth adjustment control frame to the So direction.

Step 911: determine whether it is the So; and if no, go to Step 909; if yes, go to Step 927.

Step 913: the intermediate node reserves TSN TSs.

Step 915: the intermediate node forwards the ODUflex bandwidth adjustment control frame to the next intermediate node in the Sk direction, and determines whether the next intermediate node is the Sk; and if no, go to Step 903; if yes, go to Step 917.

Step 917: the Sk sends the RSC invert control frame to the intermediate nodes in the So direction.

Step 919: determine whether it is the So; and if no, go to Step 921; if yes, go to Step 923.

Step 921: the intermediate node adds the reserved TSs to the ODUflex link, and continues to forward the RSC invert control frame in the So direction; and then go to Step 919.

Step 923: the So sends the CTRL=NORMAL ODUflex bandwidth adjustment control frame to the intermediate nodes and the Sk.

Step 925: the intermediate nodes and the Sk use the increased bandwidth to load the ODUflex.

Step 927: the increment adjustment for the ODUflex bandwidth is completed.

Figure 10:
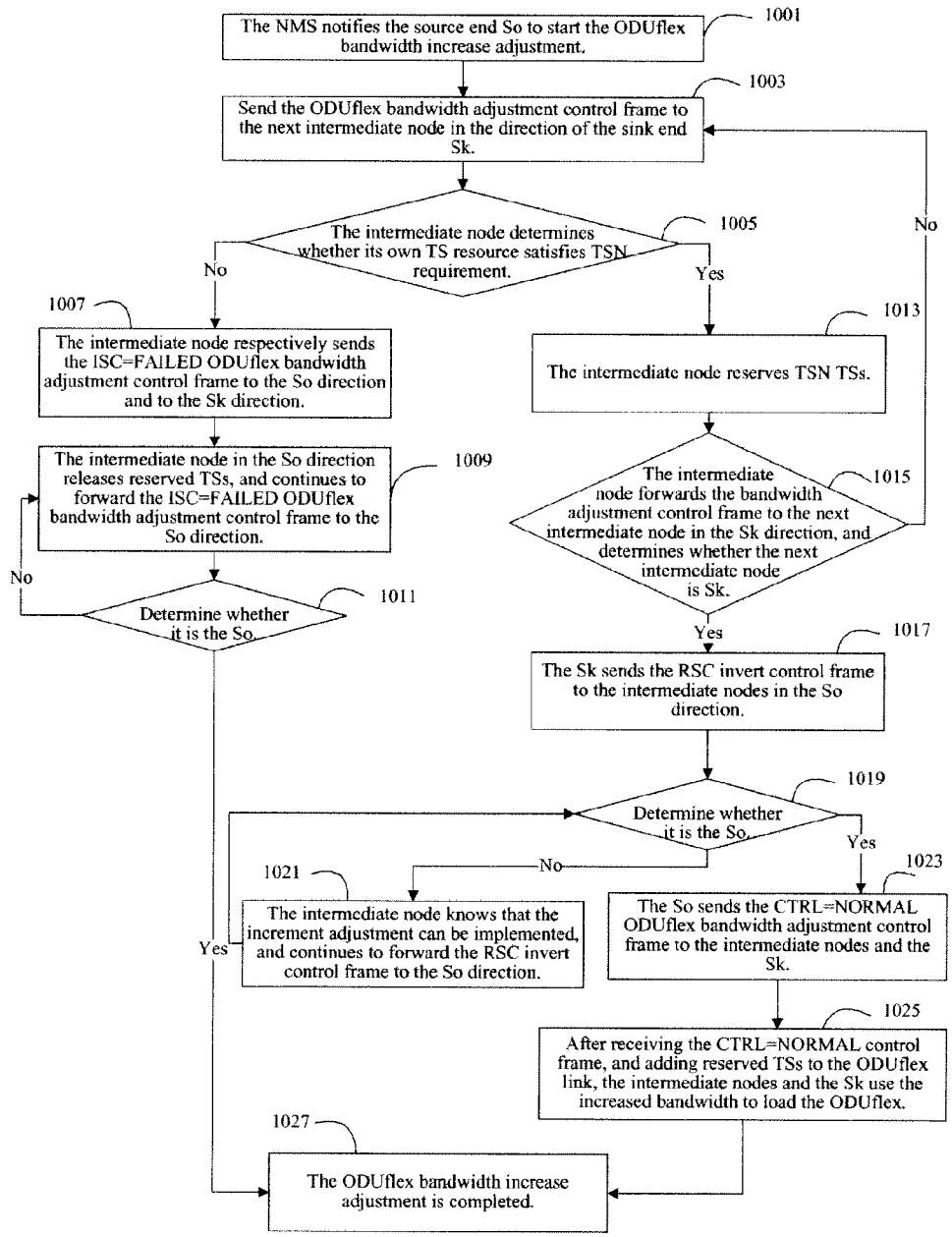
FIG. 10 shows a step flowchart of embodiment II of an ODUflex bandwidth increase adjustment method according to the embodiment of the disclosure.

As shown in FIG. 10, it shows a step flowchart of embodiment II of an ODUflex (GFP) bandwidth increase adjustment method according to the embodiment of the disclosure, specifically comprising the following steps.

Step 1001: the NMS notifies the source end So to start the increment adjustment for the ODUflex bandwidth.

The ODUflex bandwidth adjustment control frame is sent from the source end So.

Step 1003: the ODUflex bandwidth adjustment control frame is sent to the next intermediate node in the direction of the sink end Sk.

The OPU control overhead in the ODUflex bandwidth adjustment control frame is set to be CTRL=INCREMENT, ISC=OK, TP# is the port which needs to increase the bandwidth, TSN and the like.

Step 1005: the intermediate node determines whether its own TS resource satisfies the TSN requirement; and if no, go to Step 1007; if yes, go to Step 1013.

Step 1007: the intermediate node respectively sends the ISC=FAILED ODUflex bandwidth adjustment control frame to the So direction and to the Sk direction.

In this step, the intermediate node also can send the ISC=FAILED ODUflex bandwidth adjustment control frame to the So direction only.

Step 1009: the intermediate node in the So direction releases the reserved TSs and continues to forward the ISC=FAILED ODUflex bandwidth adjustment control frame to the So direction.

Step 1011: determine whether it is the So; and if no, go to Step 1009; if yes, go to Step 1027.

Step 1013: the intermediate node reserves TSN TSs.

Step 1015: the intermediate node forwards the ODUflex bandwidth adjustment control frame to a next intermediate node in the Sk direction, and determines whether the next intermediate node is the Sk; and if no, go to Step 1003, if yes, go to Step 1017.

Step 1017: the Sk sends the RSC invert control frame to the intermediate node in the So direction.

Step 1019: determine whether it is the So; and if no, go to Step 1021, if yes, go to Step 1023.

Step 1021: the intermediate node knows that the increment adjustment can be implemented, and continues to forward the RSC invert control frame to the So direction; and then go to Step 1019.

Step 1023: the So sends the CTRL=NORMAL ODUflex bandwidth adjustment control frame to the intermediate nodes and Sk.

Step 1025: after receiving the CTRL=NORMAL control frame, and adding the reserved TSs to the ODUflex link, the intermediate nodes and Sk use the increased bandwidth to load the ODUflex.

Step 1027: the ODUflex bandwidth increase adjustment is completed.

Figure 11:
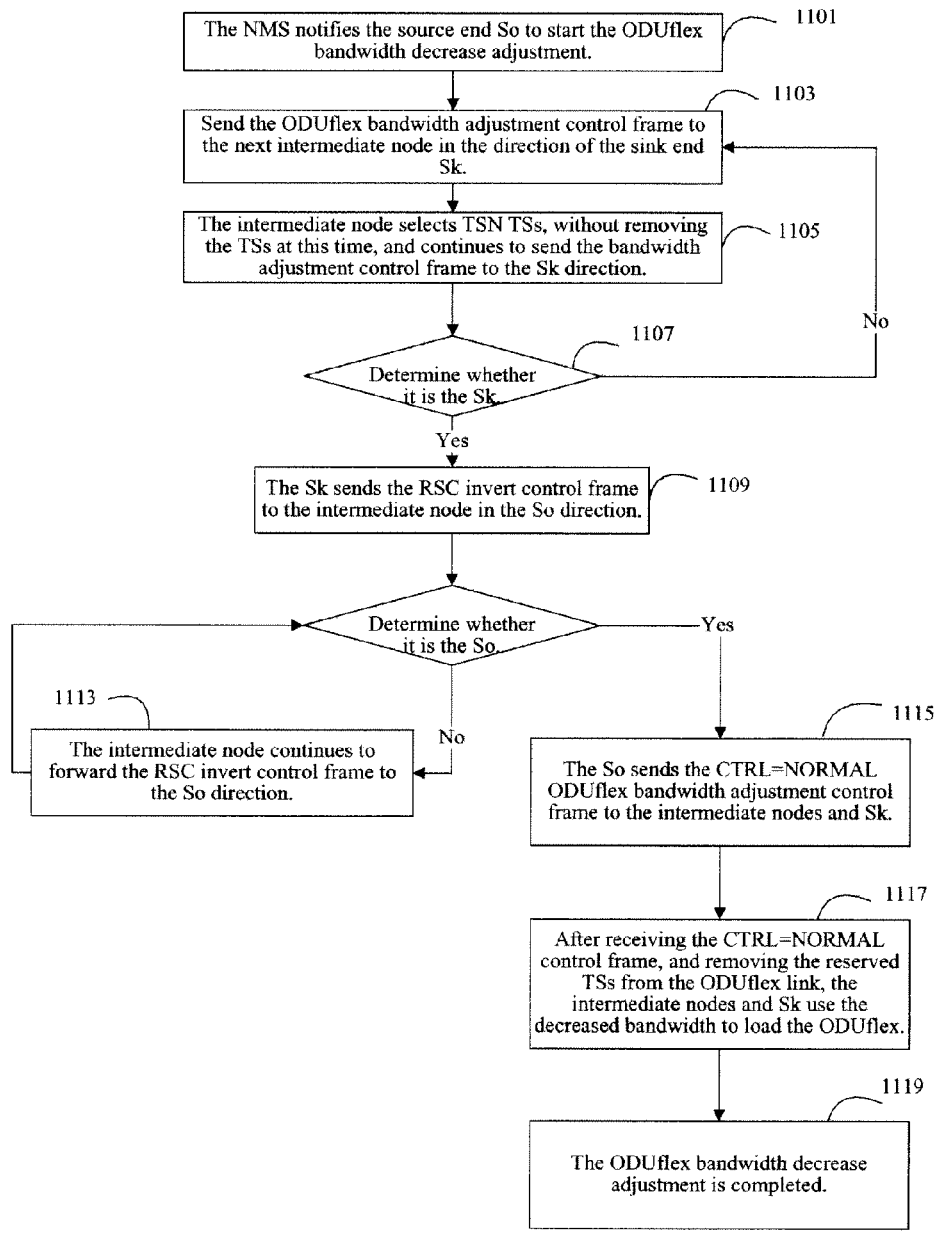
FIG. 11 shows a step flowchart of an embodiment of an ODUflex bandwidth decrease adjustment method of the disclosure.

As shown in FIG. 11, it shows a step flowchart of an embodiment of an ODUflex(GFP) bandwidth decrease adjustment method of the disclosure, specifically comprising the following steps.

Step 1101: the NMS notifies the source end So to start the ODUflex bandwidth decrease adjustment.

The ODUflex bandwidth adjustment control frame is sent from the source end So.

Step 1103: the ODUflex bandwidth adjustment control frame is sent to a next intermediate node in the direction of the sink end Sk.

The OPU control overhead in the ODUflex bandwidth adjustment control frame is set to be CTRL=DECREMENT, ISC=OK, TP# is the port which needs to increase the bandwidth, TSN and the like.

Step 1105: the intermediate node selects TSN TSs, without removing the TSs at this time, and continues to send the ODUflex bandwidth adjustment control frame to the Sk direction.

Step 1107: determine whether it is the Sk; and if no, go to Step 1103; if yes, go to Step 1109.

Step 1109: the Sk sends the RSC invert control frame to the intermediate node in the So direction.

Step 1111: determine whether it is the So; and if no, go to Step 1113; if yes, go to Step 1115.

Step 1113: the intermediate node continues to forward the RSC invert control frame to the So direction; and then go to Step 1111.

Step 1115: the So sends the CTRL=NORMAL ODUflex bandwidth adjustment control frame to the intermediate nodes and Sk.

Step 1117: after receiving the CTRL=NORMAL control frame, and removing the reserved TSs from the ODUflex link, the intermediate nodes and Sk use the adjusted bandwidth to load the ODUflex.

Step 1119: the ODUflex bandwidth decrease adjustment is completed.

Obviously, those skilled in the art should understand that each of the mentioned modules or steps of the disclosure can be realized by universal computing devices. The modules or steps can be focused on single computing device, or distributed on the network formed by multiple computing devices. Optionally, they can be realized by the program codes which can be executed by the computing device. Thereby, the modules or steps can be stored in the storage device and executed by the computing device. Under some circumstances, the shown or described steps can be executed in different orders, or can be independently manufactured as each integrated circuit module, or multiple modules or steps thereof can be manufactured to be single integrated circuit module, so as to be realized. Thus, the disclosure cannot be limited by any combination of the specific hardware and software.

The above is only the preferred embodiments of the disclosure and is not intended to limit the scope of protection of the disclosure. For those skilled in the art, the disclosure can have various improvements and modifications. And any modifications, equivalent replacements, improvements and the like within the spirit and principle of the disclosure shall fall within the scope of protection of the disclosure.

What is claimed is:

1. A bandwidth adjustment method for Optical channel Data Unit flexible (ODUflex) based on the Generic Framing Procedure (GFP), comprising steps of:
    a source end sending a bandwidth adjustment control frame which contains bandwidth adjustment parameters;
    a plurality of intermediate nodes forwarding the bandwidth adjustment control frame to a sink end via an ODUflex link, and during the forwarding process, if the plurality of intermediate nodes determine that resource of the plurality of intermediate nodes satisfy the bandwidth adjustment parameters, then a reserving bandwidth adjustment resource;

after receiving the bandwidth adjustment control frame, the sink end feeding back to the source end an adjustment acknowledgment frame which contains adjustment acknowledgment information via the plurality of intermediate nodes; and the plurality of intermediate nodes using the reserved bandwidth adjustment resource to implement adjustment for bandwidth of the ODUflex link according to the adjustment acknowledgement information of the adjustment acknowledgment frame;

wherein the bandwidth adjustment parameters comprise: a state indicator, a branch port number indicator, a number of branch Time Slot (TS) indicator, an intermediate mode state indicator and an adjustment state confirmation indicator.

2. The method according to claim 1, wherein the state indicator comprises one of: an increment indicator, a decrement indicator and a normal state.

3. The method according to claim 2, wherein when the state indicator is the increment indicator, the step that the plurality of intermediate nodes use the reserved bandwidth adjustment resource to implement adjustment for the bandwidth of the ODUflex link according to the adjustment acknowledgement information of the adjustment acknowledgment frame comprises:

the plurality of intermediate nodes adding the reserved bandwidth adjustment resource to the ODUflex link; and after receiving the adjustment acknowledgement frame, the source end setting the state indicator of the bandwidth adjustment control frame to be the normal state, and sending the bandwidth adjustment control frame; or after receiving the adjustment acknowledgement frame, the source end setting the state indicator of the bandwidth adjustment control frame to be the normal state, and sending the bandwidth adjustment control frame; and during the forwarding process, the plurality of intermediate nodes adding the reserved bandwidth adjustment resource to the ODUflex link.

4. The method according to claim 3, wherein the bandwidth adjustment parameters are located in the first, second and third rows of the fifteenth column in an Optical channel Payload Unit flexible Payload (OPUflex) OH area of the ODUflex.

5. The method according to claim 4, wherein the bandwidth adjustment control frame is a multi-frame, including 4*N frames, where N is a natural number.

6. The method according to claim 2, wherein when the state indicator is the decrement indicator, the step that the plurality of intermediate nodes use the reserved bandwidth adjustment resource to implement adjustment for the bandwidth of the ODUflex link according to the adjustment acknowledgement information of the adjustment acknowledgment frame comprises:

the plurality of intermediate nodes removing the reserved bandwidth adjustment resource from the ODUflex link; and after receiving the adjustment acknowledgement frame, the source end setting the state indicator of the bandwidth adjustment control frame to be the normal state, and sending the bandwidth adjustment control frame; or after receiving the adjustment acknowledgement frame, the source end setting the state indicator of the bandwidth adjustment control frame to be the normal state, and sending the bandwidth adjustment control frame; and during the forwarding process, the plurality of intermediate nodes removing the reserved bandwidth adjustment resource from the ODUflex link.

7. The method according to claim 6, wherein the bandwidth adjustment parameters are located in the first, second and third rows of the fifteenth column in an Optical channel Payload Unit flexible Payload (OPUflex) OH area of the ODUflex.

8. The method according to claim 7, wherein the bandwidth adjustment control frame is a multi-frame, including 4*N frames, where N is a natural number.

9. The method according to claim 1, wherein the bandwidth adjustment parameters are located in the first, second and third rows of the fifteenth column in an Optical channel Payload Unit flexible Payload (OPUflex) OH area of the ODUflex.

10. The method according to claim 9, wherein the bandwidth adjustment control frame is a multi-frame, including 4*N frames, where N is a natural number.

11. The method according to claim 1, wherein the method further comprises steps of:

during the process of forwarding the bandwidth adjustment control frame to the sink end, if the plurality of intermediate nodes determine that the resource of the plurality of intermediate nodes cannot satisfy the bandwidth adjustment parameters, then stopping forwarding the bandwidth adjustment control frame, and sending an adjustment failure frame which contains adjustment failure information to the source end; and the source end receiving the adjustment failure frame, and stopping adjusting the bandwidth of the ODUflex link.

12. The method according to claim 11, wherein the step of sending the adjustment failure frame which contains the adjustment failure information to the source end comprises:

one intermediate node determining that the resource of the intermediate node cannot satisfy the bandwidth adjustment parameters; and the plurality of intermediate nodes, which are before the intermediate node which determines that the resource is insufficient in the direction of the source end, forwarding the adjustment failure frame which contains the adjustment failure information to the source end, and releasing the reserved bandwidth adjustment resource.

13. A bandwidth adjustment system for Optical channel Data Unit flexible (ODUflex) based on the Generic Framing Procedure (GFP), comprising:

a source end, configured to send a bandwidth adjustment control frame which contains bandwidth adjustment parameters;

a plurality of intermediate nodes, which comprise:

a forwarding module, configured to forward the bandwidth adjustment control frame to a sink end via an ODUflex link, and forward an adjustment acknowledgement frame which contains adjustment acknowledgement information to the source end;

a reservation module, configured to, during the forwarding process, if it is determined that resource of the plurality of intermediate nodes satisfy the bandwidth adjustment parameters, reserve a bandwidth adjustment resource; and an adjustment module, configured to use the reserved bandwidth adjustment resource to adjust the bandwidth of the ODUflex link according to the adjustment acknowledgement information of the adjustment acknowledgement frame; and the sink end, configured to send the adjustment acknowledgement frame after receiving the bandwidth adjustment control frame;

wherein the bandwidth adjustment parameters comprise: a state indicator, a branch port number indicator, a number of branch Time Slot (TS) indicator, an intermediate mode state indicator and an adjustment state confirmation indicator.

14. The system according to claim 13, wherein said state indicator comprises one of: an increment indicator, an decrement indicator and a normal state.

15. The system according to claim 14, wherein the adjustment module comprises:
a resource increasing sub-module, configured to add the reserved bandwidth adjustment resource to the ODUflex link when the state indicator is the increment indicator; and
a resource decreasing sub-module, configured to remove the reserved bandwidth adjustment resource from the ODUflex link when the state indicator is the decrement indicator.

16. The system according to claim 13, wherein the plurality of intermediate nodes further comprise:

an adjustment failure module, configured to, during the forwarding process, if it is determined that the resource of the plurality of intermediate nodes cannot satisfy the bandwidth adjustment parameters, stop forwarding the bandwidth adjustment control frame, and send the adjustment failure frame which contains the adjustment failure information to the source end; and the source end is further configured to receive the adjustment failure frame, and stop adjusting the bandwidth of the ODUflex link.

17. The system according to claim 16, wherein the plurality of intermediate nodes further comprise:

a resource releasing module, configured to receive the adjustment failure frame, and release the reserved bandwidth adjustment resource.

* * * * *